United States Patent
Xia

(10) Patent No.: US 10,006,357 B1
(45) Date of Patent: Jun. 26, 2018

(54) FULL CYCLE ROTARY ENGINE COMBINATION

(71) Applicant: Zhong Ai Xia, Pittsburgh, PA (US)

(72) Inventor: Zhong Ai Xia, Pittsburgh, PA (US)

( * ) Notice: Subject to any disclaimer, the term of this patent is extended or adjusted under 35 U.S.C. 154(b) by 0 days. days.

(21) Appl. No.: 15/670,071

(22) Filed: Aug. 7, 2017

(51) Int. Cl.
  *F02B 53/08* (2006.01)
  *F02B 53/06* (2006.01)
  *F02B 55/16* (2006.01)

(52) U.S. Cl.
  CPC .............. *F02B 53/08* (2013.01); *F02B 53/06* (2013.01); *F02B 55/16* (2013.01)

(58) Field of Classification Search
  CPC ........... F02B 53/08; F02B 55/16; F02B 53/06
  USPC ......... 123/18 A, 18 R, 43 A, 43 R, 200–249; 60/39.55; 418/140, 187, 61.1
  See application file for complete search history.

(56) References Cited

U.S. PATENT DOCUMENTS

| | | | | |
|---|---|---|---|---|
| 1,337,218 A * | 4/1920 | Glaze | ...................... | F02B 53/00 123/248 |
| 2,237,591 A * | 4/1941 | Dumarest | ............... | F02B 53/00 123/234 |
| 3,188,809 A * | 6/1965 | Sumner | .................... | F02B 53/00 123/240 |
| 3,289,653 A * | 12/1966 | Kuttes | ................... | F01C 1/3442 123/240 |
| 3,312,200 A * | 4/1967 | Benson | .................. | F02B 53/00 123/234 |
| 3,316,887 A * | 5/1967 | Melvin | .................. | F01C 1/3562 123/228 |
| 3,381,670 A * | 5/1968 | Kincaid | ................ | F01C 11/004 123/234 |
| 3,437,079 A * | 4/1969 | Odawara | ............... | F01C 1/3441 123/143 R |
| 3,545,413 A * | 12/1970 | Freitas | .................. | F01C 11/008 123/234 |
| 3,849,036 A * | 11/1974 | Read | ....................... | F04C 18/39 418/62 |
| 3,895,609 A * | 7/1975 | Armstrong | ............ | F01C 1/3564 123/235 |
| 3,964,448 A * | 6/1976 | Eda | ......................... | F02B 53/06 123/242 |

(Continued)

FOREIGN PATENT DOCUMENTS

| | | | | |
|---|---|---|---|---|
| EP | 0085427 A1 * | 8/1983 | ................ | F01C 1/46 |
| FR | 1153857 A * | 3/1958 | ............ | F01C 11/008 |

(Continued)

*Primary Examiner* — Jason Newton

(57) ABSTRACT

A rotary engine including a compressor unit and an expander unit, a stator having cylindrical inner wall with intake and outlet ports, a hinged gate which fits into the stator inner wall, multiple sealing-strips being loosely embedded within the stator inner wall and backed by elastic force, an eccentrically rotating rotor with a freely rotatable rotor-sleeve which engages with the hinged gate while separating pressure and non-pressure area incident to the expansion and contraction of the working space, the above components being sandwiched between end-plates, perfect dynamic sealing without solid sliding friction, a gate-operated valve conducting the working fluid from the compressor unit into the expander unit via conduit ports in duly timing. The combination of the two units performs a full and extended power cycle simultaneously during each revolution of a common straight shaft.

1 Claim, 2 Drawing Sheets

(56) References Cited

U.S. PATENT DOCUMENTS

Figure 1:
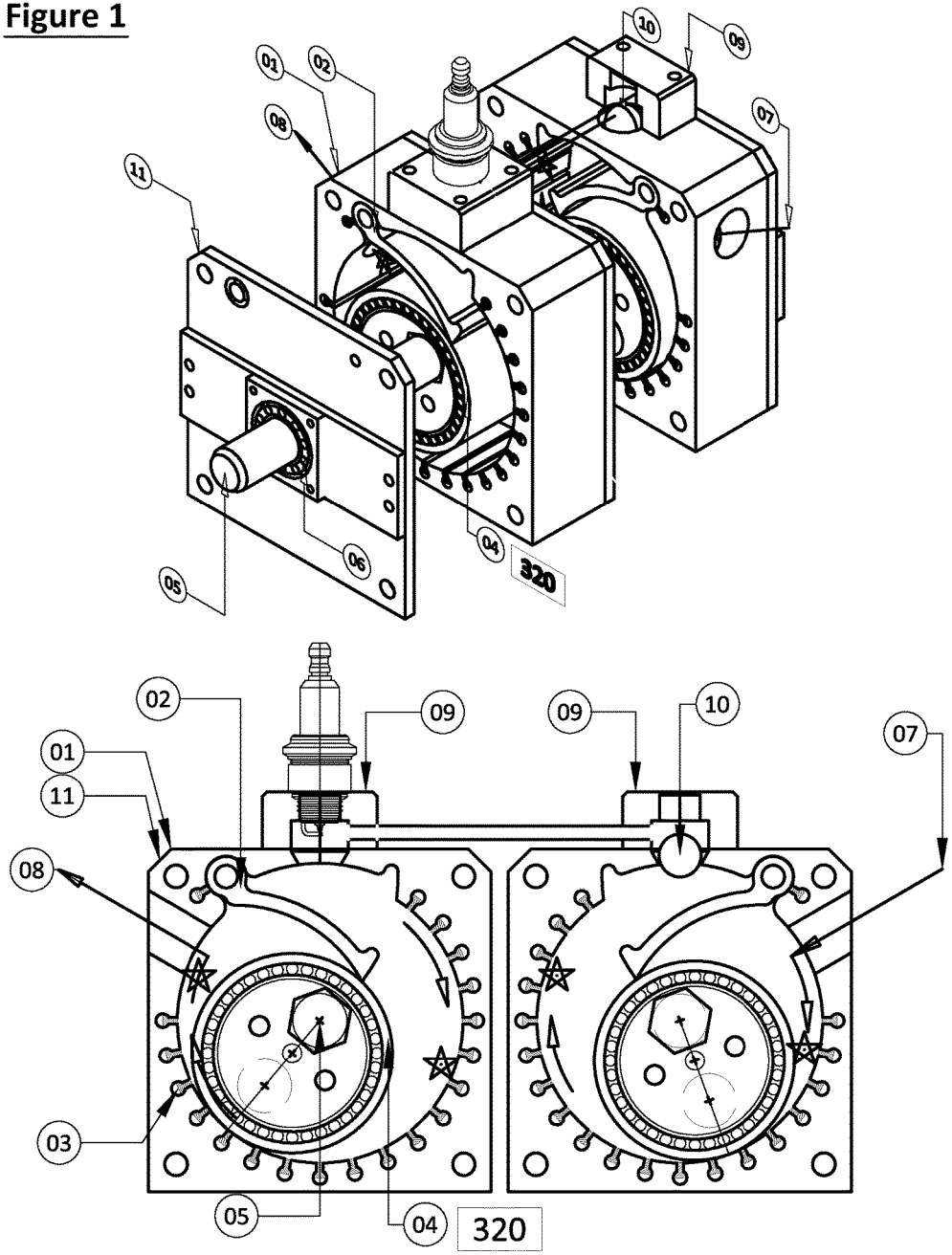

| | | | | |
|---|---|---|---|---|
| 4,080,935 A * | 3/1978 | Olson | F01C 1/46 | 123/205 |
| 4,250,851 A * | 2/1981 | Truck | F01C 1/46 | 123/240 |
| 4,286,555 A * | 9/1981 | Williams | F01B 1/12 | 123/228 |
| 4,342,295 A * | 8/1982 | Williams | F01B 1/12 | 123/228 |
| 4,342,296 A * | 8/1982 | Williams | F01B 1/12 | 123/228 |
| 4,342,297 A * | 8/1982 | Williams | F01B 1/12 | 123/228 |
| 4,423,710 A * | 1/1984 | Williams | F01C 1/46 | 123/228 |
| 4,446,829 A * | 5/1984 | Yeager | F01C 1/46 | 123/244 |
| 4,512,302 A * | 4/1985 | Bunce | F02B 53/08 | 123/238 |
| 4,548,171 A * | 10/1985 | Larson | F01C 19/04 | 123/230 |
| 4,657,009 A * | 4/1987 | Zen | F01C 1/46 | 123/204 |
| 5,247,916 A * | 9/1993 | Riney | F01C 11/004 | 123/222 |
| 5,596,963 A * | 1/1997 | Lai | F01C 11/004 | 123/236 |
| 5,713,732 A * | 2/1998 | Riney | F04C 18/3564 | 418/212 |
| 6,283,728 B1 * | 9/2001 | Tomoiu | F01C 11/004 | 417/405 |
| 8,225,767 B2 * | 7/2012 | Tinney | F01C 1/321 | 123/212 |
| 2013/0092122 A1 * | 4/2013 | Tathuzaki | F01C 1/46 | 123/241 |
| 2014/0209056 A1 * | 7/2014 | Shkolnik | F01C 1/104 | 123/241 |

FOREIGN PATENT DOCUMENTS

| | | | | |
|---|---|---|---|---|
| KR | 100936347 B1 * | 1/2010 | | F01C 1/46 |
| WO | WO 2008016979 A2 * | 2/2008 | | F01C 11/008 |

* cited by examiner

FULL CYCLE ROTARY ENGINE COMBINATION

CROSS-REFERENCE TO RELATED INVENTIONS (Not Applicable)

STATEMENT REGARDING FEDERALLY SPONSORED RESEARCH OR DEVELOPMENT (Not Applicable)

BACKGROUND OF THE INVENTION

(1) Field of the Invention

U.S. CLASS 418, Rotary Expansible Chamber Devices
U.S. CLASS 418/225

(2) Description of Related Art

A rotary machine to replace the conventional reciprocating piston-crankshaft engine is a long felt need as the potential advantages are so attractive, but nobody is successful beyond the stage of experimental prototype with poor performance, because of the difficulties to obtain all the desired characteristics.

Rotary engines so far have some serious problems, e.g. radial sealing components and housing wall suffer significant frictional loss and unacceptable wear or overheat; the combustion cycle is shortened and incomplete; the fuel efficiency was disappointing; those problems were caused by design or structure rather than components defection.

BRIEF SUMMARY OF THE INVENTION

This application solved the problems regarding rotary engines, technically and structurally in a simple and effective way, featuring:
  separated compressor and expander,
  continuous one-way fluid flow conducted via gate-operated valve,
  all rolling movement, no solid sliding friction,
  reliable dynamic sealing both radially and axially without strong pressurized sealing components,
  a combination of 2 units performs a full and extended power cycle simultaneously during each revolution of a common straight shaft.

BRIEF DESCRIPTION OF THE SEVERAL VIEWS OF THE DRAWING(S)

FIG. 1: Shows a perspective exploded view of a rotary engine combination, along with a schematic partial section view of a compressor and an expander side by side, showing the 4 stroke events processing simultaneously.

Figure 2:
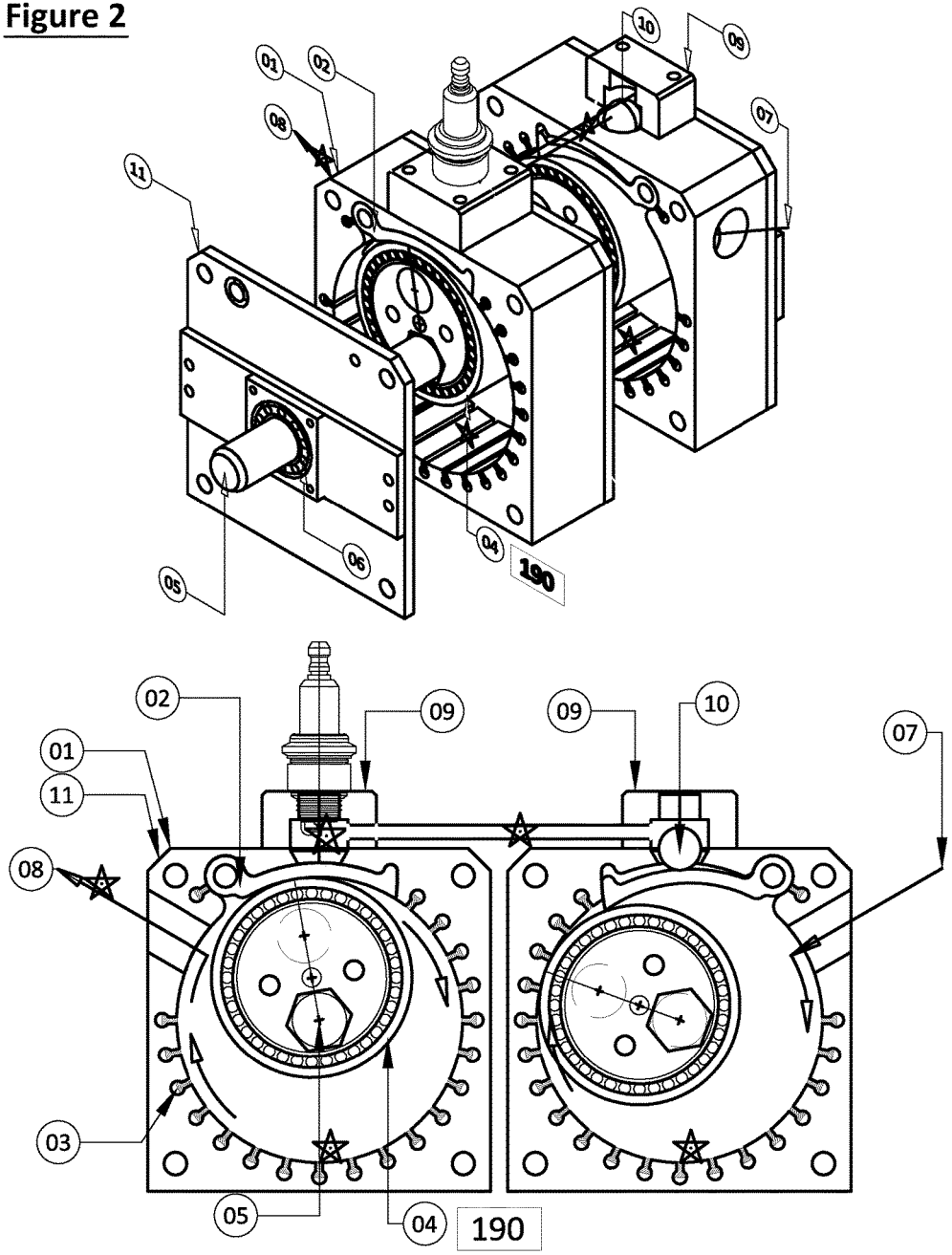

FIG. 2: Shows the same views while the compressor gate pushing the conduit valve open, conducting working fluid into the expander which is ready to ignite, as well as the intake and exhaust happen at the mean time.

DETAILED DESCRIPTION OF THE INVENTION

This is a rotary engine having no reciprocating piston, no crankshaft, no connecting rod, no cam-shaft, and no timing-belt etc.

The present application discloses a solution for a rotary engine which comprises at least a compressor unit and an expander unit, wherein each unit having similar structure as shown in Figures with parts numbered in Parts List:

PARTS LIST

01 Stator
02 Hinged Gate
03 Sealing-strips
04 Rotor-sleeve
05 Straight shaft
06 Shaft bearing
07 Intake
08 output
09 conduit port
10 conduit valve
11 End-plates a stator 01 having cylindrical inner wall with intake port 07 and outlet port 08, defines a cylindrical space and a central axis;

a hinged gate 02 fitting in a portion of the stator inner wall which is able to swing to-and-fro towards the central axis and keep open under pressure;

multiple sealing-strips 03 being loosely embedded within the stator inner wall and backed by elastic force so that being able to slide out slightly towards the central axis;

a rotor eccentrically mounted on a straight shaft 05 rotating on the central axis with shaft bearings 06 on both ends;

wherein the rotor having a rotor-sleeve 04 being able to rotate freely on axis being parallel and apart from the central axis, having true contact with the hinged gate 02 which separates pressure and non-pressure area incident to the expansion and contraction of the working space;

wherein the spinning rotor-sleeve 04 with portion of circular surface where being farther from the central axis having nearly non-contact to housing inner wall, and gentle contact with approaching sealing-strips 03;

as the rotor-sleeve 04 is free to rotate, it would have no relative movement while contacting the hinged gate 02 and the sealing-strips 03 therefore the friction between is substantially avoided;

wherein the rotor with rotor-sleeve 04, the stator 01, the hinged gate 02, and the sealing-strips 03 being sandwiched between end-plates 11 to complete dynamic axial sealing;

a gate-operated conduit valve 10 conducting the continuous working fluid from the compressor into the separated expander via conduit ports in duly timing;

wherein the rotor-sleeve 04 translates the expansion and contraction of the working space into rotational motion of the straight shaft 05.

The structure ensures reliable radial and axial dynamic sealing while eliminating any and all solid sliding friction;

Other necessary components such as fasteners, air filter, fuel, ignition, lubricate, cooling, exhaust and controlling systems are not shown in the figures.

Thus the combination of the 2 units and other necessary components performs a complete power cycle simultaneously, with a full and extended combustion which is completely separated from the exhaust during each revolution of the common straight shaft.

It would be no difficulty to combine more units on the same common shaft to produce more combustion during each revolution in duly timing.

So the new design has every reason and potential to outperform and replace piston-crankshaft engines.

Comparison between different designs:

|  | * Piston-Crankshaft Otto cycle Engines | – Problems of Wankel Rotary Engine | + Problems Solved by This Application |
|---|---|---|---|
| Power cycle during each revolution of the shaft: | * the combustion occurs 1/4 of the time sequentially in each cylinder of 4-stroke engine, | – incomplete, shortened combustion tangled with exhaust, | + full and separated power cycle while the 4 events happen simultaneously in combination of 2 units; |
| Shape/ structure: | * Reciprocating piston, poppet valves, crankshaft, connecting rod, timing-belt, etc., | – difficult shape and manufacturing for rotor and stator, crankshaft and gears | + cylindrical rotor and stator, gate-separator, eccentrically rotating rotor- sleeve, straight shaft; |
| Sealing: | * Fair with piston ring, gentle contact with cylinder on full range, | – sealing components having multi pressurized contacts with stator wall, tend to leak or overheat, | + the rotor-sleeve has single solid contact with gate, and gentle contact with multi sealing-strips with negligible relative movement |
| Friction: | * Reasonable, | – significant, | + all rolling, no solid sliding; |
| Lubrication: | * Complicated, | – excessive oil lube, | + simplified; |
| Efficiency expectation | * Less than 40%, | – less than 20% with problems, | + 60% or better. |

The invention claimed is:

1. A rotary engine comprising:
at least a compressor unit and an expander unit, wherein each unit having similar structure as follows:
   a stator having a cylindrical inner wall, at least one intake port and at least one outlet port defined by the stator, the inner wall defining a cylindrical space and a central axis,
   a hinged gate fitting in a portion of the inner wall and being able to swing to-and-fro towards the central axis,
   multiple sealing-strips positioned within the inner wall and backed by elastic force so that each of the multiple sealing-strips is able to slide towards the central axis,
   a rotor eccentrically mounted on a straight shaft rotating on the central axis, the straight shaft mounted to the stator on bearings,
   a rotor-sleeve disposed about the rotor and able to rotate freely on an axis parallel and apart from the central axis, the rotor-sleeve having contact with the hinged gate to separate a pressure area and a non-pressure area incident to expansion and contraction of a working space,
   wherein the rotor-sleeve includes a circular surface with a portion of the circular surface spaced from the central axis so as to provide gradual contact meshing with approaching ones of the multiple sealing-strips,
   wherein the rotor-sleeve converts the expansion and contraction of the working space into rotational motion of the straight shaft or vice versa,
   the rotor, the stator, the hinged gate, and the multiple sealing-strips are sandwiched between end-plates to provide axial sealing; and
   a gate-operated valve providing fluid communication between the compressor unit and the expander unit, at least one conduit port conducting a compressed working fluid from the compressor unit into the expander unit.

* * * * *